United States Patent
Kritchman et al.

(10) Patent No.: US 11,104,071 B2
(45) Date of Patent: Aug. 31, 2021

(54) PRINTING SYSTEM WITH SELF-PURGE, SEDIMENT PREVENTION AND FUMES REMOVAL ARRANGEMENTS

(71) Applicant: XJET LTD., Rehovat (IL)

(72) Inventors: Eliahu M. Kritchman, Tel-Aviv (IL); Ronen Mimon, Ashdod (IL); Hanan Gothait, Rehovot (IL)

(73) Assignee: XJET LTD., Rehovot (IL)

( * ) Notice: Subject to any disclaimer, the term of this patent is extended or adjusted under 35 U.S.C. 154(b) by 367 days.

(21) Appl. No.: 16/390,963

(22) Filed: Apr. 22, 2019

(65) Prior Publication Data

US 2019/0248139 A1    Aug. 15, 2019

Related U.S. Application Data

(60) Division of application No. 15/276,233, filed on Sep. 26, 2016, now Pat. No. 10,315,427, which is a
(Continued)

(51) Int. Cl.
*B33Y 10/00* (2015.01)
*B29C 64/209* (2017.01)
(Continued)

(52) U.S. Cl.
CPC .......... *B29C 64/209* (2017.08); *B29C 64/112* (2017.08); *B29C 64/35* (2017.08);
(Continued)

(58) Field of Classification Search
None
See application file for complete search history.

(56) References Cited

U.S. PATENT DOCUMENTS 3,451,791 A    6/1969  Meadows et al.
4,364,059 A   12/1982  Nagayama
(Continued)

FOREIGN PATENT DOCUMENTS

DE    4324647    1/1994
EP    1 918 026  5/2008
(Continued)

OTHER PUBLICATIONS

Office Action of corresponding JP Patent Application No. 2019-153213, dated Oct. 15, 2020.
(Continued)

*Primary Examiner* — Michael P. Rodriguez
(74) *Attorney, Agent, or Firm* — Finnegan, Henderson, Farabow, Garrett & Dunner LLP

(57) ABSTRACT

A printing head assembly with integrated purge mechanism is disclosed. The printing head assembly comprises: (a) a liquid dispensing head comprising one or more dispensing nozzles enclosed in a nozzle plate, driven by at least first and second pressures, and (b) a shielding mask including an opening in front of the one or more nozzles, wherein the opening being configured such that when printing liquid is dispensed from the head driven by the first pressure, the liquid being dispensed in pulses through the opening in the shielding mask, and (ii) when purge printing liquid is dispensed from the head driven by the second pressure, the liquid being drawn to a capillary gap formed between the shielding mask and the nozzle plate thereby removing the purge printing liquid from the nearby nozzles.

15 Claims, 18 Drawing Sheets

Related U.S. Application Data continuation of application No. 14/318,645, filed on Jun. 29, 2014, now Pat. No. 9,481,178, which is a continuation of application No. 13/695,793, filed as application No. PCT/IB2011/051934 on May 2, 2011, now Pat. No. 8,770,714.

(60) Provisional application No. 61/330,351, filed on May 2, 2010.

(51) Int. Cl.
| | |
|---|---|
| *B41J 2/045* | (2006.01) |
| *B41J 2/165* | (2006.01) |
| *B29C 64/112* | (2017.01) |
| *B29C 64/35* | (2017.01) |
| *B29C 64/357* | (2017.01) |
| *B41J 2/17* | (2006.01) |
| *B33Y 30/00* | (2015.01) |
| *B41J 2/18* | (2006.01) |

(52) U.S. Cl.
CPC ............ *B29C 64/357* (2017.08); *B33Y 10/00* (2014.12); *B33Y 30/00* (2014.12); *B41J 2/04566* (2013.01); *B41J 2/165* (2013.01); *B41J 2/16523* (2013.01); *B41J 2/16526* (2013.01); *B41J 2/16552* (2013.01); *B41J 2/1714* (2013.01); *B41J 2/18* (2013.01); *B41J 2002/16502* (2013.01); *B41J 2002/16558* (2013.01)

(56) References Cited

U.S. PATENT DOCUMENTS

| | | | |
|---|---|---|---|
| 4,847,636 | A | 7/1989 | Durbeck et al. |
| 5,136,515 | A | 8/1992 | Helinski |
| 5,151,377 | A | 9/1992 | Hanoka et al. |
| 5,640,183 | A | 6/1997 | Hackleman |
| 5,877,788 | A | 3/1999 | Haan et al. |
| 6,203,136 | B1 | 3/2001 | Takahashi et al. |
| 6,291,123 | B1 | 9/2001 | Ohno et al. |
| 6,305,769 | B1 | 10/2001 | Thayer et al. |
| 6,328,418 | B1 | 12/2001 | Yamada et al. |
| 6,471,352 | B2 | 10/2002 | Akahira |
| 6,514,343 | B1 | 2/2003 | Motoda |
| 6,536,853 | B2 | 3/2003 | Egle et al. |
| 6,536,863 | B1 | 3/2003 | Beauchamp et al. |
| 6,596,224 | B1 | 7/2003 | Sachs et al. |
| 6,824,245 | B2 | 11/2004 | Silverbrook et al. |
| 7,037,448 | B2 | 5/2006 | Nagai et al. |
| 7,222,930 | B2 | 5/2007 | Niimi |
| 7,393,073 | B2 | 7/2008 | Zach |
| 7,479,297 | B2 | 1/2009 | Miura |
| 7,494,607 | B2 | 2/2009 | Wang et al. |
| 7,502,023 | B2 | 3/2009 | Zinniel et al. |
| 7,506,960 | B2 | 3/2009 | Chikanawa et al. |
| 7,513,595 | B2 | 4/2009 | Nakamura |
| 7,604,320 | B2 | 10/2009 | Robertson et al. |
| 7,717,540 | B1 | 5/2010 | King et al. |
| 7,718,092 | B2 | 5/2010 | Rose et al. |
| 7,919,538 | B2 | 4/2011 | Vo et al. |
| 7,963,634 | B2 | 6/2011 | Yokouchi |
| 8,319,808 | B2 | 11/2012 | Sadowara et al. |
| 9,004,667 | B2 | 4/2015 | Taguchi |
| 2002/0015855 | A1 | 2/2002 | Sajoto et al. |
| 2004/0041892 | A1 | 3/2004 | Yoneyama et al. |
| 2004/0115339 | A1 | 6/2004 | Ito |
| 2004/0145858 | A1 | 7/2004 | Sakurada |
| 2004/0151978 | A1 | 8/2004 | Huang |
| 2004/0246294 | A1 | 12/2004 | Mitsuzawa |
| 2005/0104241 | A1 | 5/2005 | Kritchman et al. |
| 2005/0151792 | A1 | 7/2005 | Niimi |
| 2005/0253879 | A1 | 11/2005 | Yamanobe |
| 2006/0044331 | A1 | 3/2006 | Tsutsumi et al. |
| 2006/0045962 | A1 | 3/2006 | Miura |
| 2006/0132571 | A1 | 6/2006 | Baker et al. |
| 2007/0063366 | A1 | 3/2007 | Cunningham et al. |
| 2007/0107773 | A1 | 5/2007 | Fork et al. |
| 2007/0153035 | A1 | 7/2007 | Jung et al. |
| 2007/0211105 | A1 | 9/2007 | Furukawa |
| 2007/0229611 | A1 | 10/2007 | Nagashima |
| 2008/0024557 | A1 | 1/2008 | Moyhihan |
| 2008/0158278 | A1 | 7/2008 | Inoue |
| 2008/0278535 | A1 | 11/2008 | Yamada et al. |
| 2008/0314276 | A1 | 12/2008 | Gothait |
| 2009/0145479 | A1 | 6/2009 | Williams |
| 2009/0244153 | A1 | 10/2009 | Miyamoto |
| 2009/0321123 | A1 | 12/2009 | Lochtman et al. |
| 2010/0040767 | A1 | 2/2010 | Uibel et al. |
| 2010/0061925 | A1 | 3/2010 | Lee et al. |
| 2011/0109693 | A1* | 5/2011 | Ohnishi ............... B41J 29/02 347/34 |
| 2011/0151665 | A1 | 6/2011 | Gothati et al. |
| 2011/0227988 | A1 | 9/2011 | Yamazaki |
| 2011/0279544 | A1 | 11/2011 | Dovrat et al. |
| 2011/0292153 | A1 | 12/2011 | Sadowara et al. |
| 2012/0015152 | A1 | 1/2012 | Takahashi et al. |
| 2012/0062640 | A1 | 3/2012 | Uraki et al. |
| 2012/0081455 | A1 | 4/2012 | Kritchman et al. |
| 2012/0111409 | A1 | 5/2012 | Kim et al. |
| 2012/0308837 | A1 | 12/2012 | Schlechtriemen et al. |
| 2013/0141491 | A1 | 6/2013 | Krichtman et al. |
| 2013/0176355 | A1 | 7/2013 | Kritchman et al. |
| 2013/0208048 | A1 | 8/2013 | Kritchman et al. |
| 2014/0360762 | A1 | 12/2014 | Lee |
| 2015/0255632 | A1 | 9/2015 | Kritchman et al. |
| 2015/0298394 | A1 | 10/2015 | Sheinman |
| 2016/0039207 | A1 | 2/2016 | Kritchman et al. |
| 2016/0229128 | A1 | 8/2016 | Dayagi et al. |
| 2016/0236372 | A1 | 8/2016 | Benichou et al. |
| 2016/0243619 | A1 | 8/2016 | Gothait et al. |

FOREIGN PATENT DOCUMENTS

| | | |
|---|---|---|
| EP | 2028240 | 2/2009 |
| EP | 2083052 | 7/2009 |
| EP | 2390406 | 11/2011 |
| JP | 03-184852 | 8/1991 |
| JP | 03-262646 | 11/1991 |
| JP | 04-235054 | 8/1992 |
| JP | H09-193404 | 7/1997 |
| JP | 11-342598 | 12/1999 |
| JP | H11-342598 | 12/1999 |
| JP | H11-342598 A | 12/1999 |
| JP | 2001-341319 | 12/2001 |
| JP | 2003-001807 A | 1/2003 |
| JP | 2003-133692 | 5/2003 |
| JP | 2003-527955 A | 9/2003 |
| JP | 2004-042551 | 2/2004 |
| JP | 2005-288913 A | 10/2005 |
| JP | 2007-152161 | 6/2006 |
| JP | 2007-061784 | 3/2007 |
| JP | 2007-061784 A | 3/2007 |
| JP | 2007-152259 A | 6/2007 |
| JP | 2008-124413 | 5/2008 |
| JP | 2008-155114 A | 7/2008 |
| JP | 2008-528324 A | 7/2008 |
| JP | 2008-201102 | 9/2008 |
| JP | 2009-034830 | 2/2009 |
| JP | 2009-226717 | 10/2009 |
| JP | 2010-069856 | 4/2010 |
| JP | 2011-016301 | 1/2011 |
| JP | 2011-116141 | 6/2011 |
| KR | 10-0274473 B1 | 3/2001 |
| WO | WO 2001-070506 A2 | 9/2001 |
| WO | WO 2001-070506 A3 | 9/2001 |
| WO | WO-2006-081310 | 8/2006 |
| WO | WO 2006-081310 A2 | 8/2006 |
| WO | WO 2007-076424 | 7/2007 |
| WO | WO 2008-084972 | 7/2008 |
| WO | WO-2009-017648 | 2/2009 |
| WO | WO 2009-029939 | 3/2009 |

(56) References Cited

FOREIGN PATENT DOCUMENTS

| WO | WO 2009-141448 | 11/2009 |
| WO | WO 2012-078820 | 6/2012 |
| WO | WO 2014-068579 | 5/2014 |

OTHER PUBLICATIONS

Ahn B. Y. et al. "Printed Origami Structures"—Published online: Apr. 15, 2010.

Cappi B. et al. "Direct inkjet printing of Si3N4: Characterization of ink, green bodies and microstructure", 2008, Journal of the European Ceramic Society, vol. 28 pp. 2625-2628 (published on line: Apr. 28, 2008).

Hong E. et al. "Microstructure and Mechanical Properties of Reticulated Titanium Scrolls"—Published online: Aug. 29, 2011.

International Search Report dated Feb. 17, 2015 in International Application No. PCT-IB2014-065400 (6 pages).

International Search Report dated Feb. 19, 2016 in International Application No. PCT-IL2013050453 (7 pages).

International Search Report dated Jan. 11, 2015 in International Application No. PCT-IB2014-065401 (6 pages).

International Search Report dated Oct. 17, 2014 in International Application No. PCT-IB2014-065402 (7 pages).

Mott M. et al."Microengineering of Ceramics by Direct Ink-Jet Printing" ,1999, J. Am. Ceram. Soc., vol. 82, No. 7, pp. 1653-1658 (Jul. 31, 1999) DOI: 10.1111-j.1151-2916.1999.tb0.

Ozkol E. et al. "Development of high solid content aqueous 3Y-TZP suspensions for direct inkjet printing using a thermal inkjet printer", 2009, Journal of the European Ceramic Society, vol. 29, pp. 403-409 (published on line: Aug. 13, 2008).

Song H. J. et al. "Formulation and Multilayer jet Printing of Ceramic inks", 1999, J. Am. 1-3,13-17,27,28 Ceram. Soc., vol. 82 ,No. 12, pp. 3374-3380 (Dec. 31, 1999).

TriTrust Industrial, "Preparation of superfine TiH2 powder with high energy ball milling"—Published online: Oct. 9, 2014.

\* cited by examiner

PRINTING SYSTEM WITH SELF-PURGE, SEDIMENT PREVENTION AND FUMES REMOVAL ARRANGEMENTS

CROSS REFERENCE TO RELATED APPLICATIONS

This application is a divisional of and claims priority from U.S. application Ser. No. 15/276,233, filed Sep. 26, 2016, which claims priority to U.S. application Ser. No. 14/318,645, filed Jun. 29, 2014, which claims priority to U.S. application Ser. No. 13/695,793, filed Nov. 2, 2012, which is a U.S. national application of PCT International Application No. PCT/IB2011/051934, filed May 2, 2011, which claims the benefit of U.S. provisional Application No. 61/330,351, filed May 2, 2010, all of which are incorporated herein by reference in their entirety.

FIELD OF THE INVENTION

The present embodiment generally relates to the field of printing, and in particular, it concerns a printing system with an integrated self-purge, sediment prevention and fumes removal arrangements.

BACKGROUND OF THE INVENTION

It is known in the field of printing that inkjet printing heads require periodic purging to clean the printing nozzles, remove air bubbles, and maintain printing quality. Simply stated, inkjet printers operate by expelling a small volume of ink from a plurality of nozzles through corresponding small orifices in a nozzle plate held in proximity to a paper or front surface of a solar cell or other medium upon which printing or marks are to be placed. These orifices are arranged in a fashion in the nozzle plate such that the expulsion of droplets of ink from a selected number of nozzles relative to a particular position of the medium results in the production of a portion of a desired character or image. Controlled repositioning of the medium followed by another expulsion of ink droplets results in the creation of more segments of the desired character or image.

A solar cell is a solid state semiconductor device that converts the energy of sunlight directly into electricity. Most large-scale commercial solar cell factories make printed poly-crystalline silicon solar cells. The printed poly-crystalline silicon solar cells have grid-like metal contacts made up of fine fingers and larger bus bars printed onto the front surface using a silver paste inkjet printing. The grid-like metal contact is made of 60 to 100 printed silver lines, 2 millimeter (mm) apart and having a typical width of 100 micrometers (um).

The frequency of purging the printing head depends on the specific application for which the printing head is being used. Purging includes forcefully pushing a printing liquid out of the inkjet head through the nozzles under an excess pressure of roughly 0.5 Bar. The force of the excess pressure is relative to a normal reduced pressure used during printing of about −0.01 Bar.

One of the disadvantages of conventional purging techniques is that a printing head needs to be shifted from the printing area to a maintenance area where the purged liquid is able to drip from the head, and any liquid that drips from the head will not adversely affect the printing process. A nozzle plate, as is generally known in the industry, is located on the printing side of the printing head, providing access for the nozzles to print while providing protection for the printing head, among other features.

After purging, it is preferable for a nozzle plate to be cleaned, known as wiping, to remove purged liquid and enable proper jetting of the printing liquid from the nozzles. In order to preserve the smoothness and anti-wetting characteristic of the nozzle plate, it is desirable to perform wiping without contact to the nozzle plate.

One conventional technique for wiping without contact to the nozzle plate is vacuum wiping, where a vacuum head is moved across the nozzle plate. The vacuum head does not contact the nozzle plate but is sufficiently close to allow the vacuum, also known as suction, to remove the purged liquid from the nozzle plate. As the vacuum head does not contact the nozzle plate, there is suction from all sides of the vacuum head (not just from the direction of the nozzle plate) resulting in low cleaning efficiency of the nozzle plate.

Disadvantages to conventional vacuum wiping include cost, printing speed, reliability, and quality of wiping. Examples of the disadvantages of conventional vacuum wiping include: (a) The printing head requires shifting from the printing area to a maintenance area due to the possibility of purged liquid dripping from the printing head, (b) Shifting a printing head from a printing area to a maintenance area takes time, resulting in reduced printing speed and correspondingly increased cost. (c) The printing machine requires very high precision elements and structure to enable a vacuum slit to move across the nozzle plate at a small distance without contact, for example about 0.15 mm Higher precision elements increase the cost of a printing machine, and the reliability of wiping is dependent on maintaining high precision, (d) Effective wiping requires the vacuum slit to move across the nozzle plate at a slow speed, for example about 2 mm/s (millimeters per second). The time required for effective wiping reduces printing speed and correspondingly increases printing cost.

There is therefore a need for a printing system that may be used for printing a solar cell grid-like metal contact for example that enables purging without purged liquid dripping from the nozzle plate (or in general from the printing head). It is further desirable for high quality cleaning with lower costs and higher reliability than current techniques. Furthermore, there is a need to prevent the formation of sediment on the nozzle plate and for removing part of the fumes accumulated on the nozzle surface to prevent deflection of the printed ink jets.

SUMMARY OF THE INVENTION

Embodiments of the present invention disclose a printing head assembly with integrated purge mechanism. The printing head assembly comprises: (a) a liquid dispensing head comprising one or more dispensing nozzles enclosed in a nozzle plate, driven by at least first and second pressures, and (b) a shielding mask including an opening in front of the one or more nozzles, wherein the opening being configured such that when printing liquid is dispensed from the head driven by the first pressure, the liquid being dispensed in pulses through the opening in the shielding mask, and (ii) when purge printing liquid is dispensed from the head driven by the second pressure, the printing liquid being drawn to a capillary gap formed between the shielding mask and the nozzle plate thereby removing the purge printing liquid from the nearby nozzle.

According to a further feature of an embodiment of the present invention, the printing head assembly includes one or more printing head assemblies with integrated purge mechanisms.

According to a further feature of an embodiment of the present invention, the printing head assembly includes a plurality of printing heads, wherein the shielding mask includes an opening in front of each of the printing heads.

According to a further feature of an embodiment of the present invention, the shielding mask opening includes a slit.

According to a further feature of an embodiment of the present invention, the one or more nozzles are configured close to an edge of the slit in each of the printing heads such that the purge printing liquid is drawn to the capillary gap via the edge of the slit.

According to a further feature of an embodiment of the present invention, the slit is off center relative to the nozzles such that a distance from the nozzles to one edge of the slit is less than 20% of a distance from the nozzles to an opposing edge of the slit.

According to a further feature of an embodiment of the present invention, a suction system is in fluid interconnection with the capillary gap, the suction system providing a pressure gradient to the capillary gap, thereby removing the purge printing liquid from the capillary gap.

According to a further feature of an embodiment of the present invention, a suction system is in fluid interconnection with the capillary gap removably attached underneath the opening, the suction system providing a pressure gradient to the opening, thereby removing the purge printing liquid from the capillary gap via the opening.

According to a further feature of an embodiment of the present invention, the shielding mask further includes a printing head housing, According to a further feature of an embodiment of the present invention, the printing head assembly includes a cooling system that cools the printing head housing.

According to a further feature of an embodiment of the present invention, the printing head assembly includes further a printing liquid storage and re-circulation system that returns the purge printing liquid that has been captured in the capillary gap to the printing head assembly printing liquid storage.

According to a further feature of an embodiment of the present invention, the purge printing liquid may be dispensed while the printing head is in a printing area.

According to a further feature of an embodiment of the present invention, the printing head housing further includes an auxiliary suction system deployed to evacuate at least part of the fumes that emerge from the dispensed printing liquid on a heated printed substrate, or from a hot pool of volatile liquid underneath the printing head while the printing head exits the printing area, to maintain a predefined level of moisture adjacent to the nozzles plate.

According to a further feature of an embodiment of the present invention, a method for printing is disclosed. The method includes the steps of: (a) providing a printing head assembly with integrated purge mechanism, each printing head assembly including: (i) a printing head including one or more nozzles; and (ii) a shielding mask including an opening aligned with the multitude of nozzles; wherein a capillary gap is created between the printing head and the printing mask; (b) printing by actuating the printing head with a first pressure such that a printing liquid is dispensed in pulses from the printing head passing through the opening; and (c) purging by forcing printing liquid through the one or more nozzles with a second pressure such that the dispensed liquid is drawn to the capillary gap.

According to a further feature of an embodiment of the present invention, the method uses one or more printing head assemblies with integrated purge mechanisms.

According to a further feature of an embodiment of the present invention, the shielding mask including an opening in front of each of the printing heads.

According to a further feature of an embodiment of the present invention, the shielding mask opening includes a slit.

According to a further feature of an embodiment of the present invention, the method includes the step of configuring the one or more nozzles close to an edge of the slit in each of the printing heads such that the purge printing liquid is drawn to the capillary gap via the edge of the slit.

According to a further feature of an embodiment of the present invention, the method includes the step of configuring the slit off center relative to the nozzles such that a distance from the nozzles to one edge of the slit is less than 20% of a distance from the nozzles to an opposing edge of the slit.

According to a further feature of an embodiment of the present invention, the method includes the step of re-circulating the printing liquid that has been drawn to the capillary gap to a printing head assembly printing liquid storage.

According to a further feature of an embodiment of the present invention, the method includes the step of removing the printing liquid from the capillary gap using a suction system fluidly connected to the capillary gap, the vacuum system providing a pressure gradient to the capillary gap, thereby removing the printing liquid from the capillary gap.

According to a further feature of an embodiment of the present invention, the method includes the step of removing the printing liquid from the capillary gap using a suction system in fluid interconnection with the capillary gap removably attached to the underneath the opening, the suction system providing a pressure gradient to the opening, thereby removing the purge printing liquid from the capillary gap via the opening.

According to a further feature of an embodiment of the present invention, a method for printing by an inkjet head is disclosed. The method includes jetting nozzles enclosed in a nozzles plate, wherein the nozzles plate being kept wet during printing so as to prevent accumulation of solid sediment on the nozzles plate.

According to a further feature of an embodiment of the present invention, the step of keeping the nozzles plate wet is accomplished by fumes that emerge from the ejected printing liquid accumulated on a heated substrate.

According to a further feature of an embodiment of the present invention, the step of keeping the nozzles plate wet is accomplished by fumes that emerge from a hot pool of volatile liquid underneath the printing head while the printing head exits the printing area.

According to a further feature of an embodiment of the present invention, the step of removing part of the fumes by an auxiliary suction system is performed in order to maintain a predefined level of moisture adjacent to the nozzles plate.

According to a further feature of an embodiment of the present invention, the step of wiping the nozzle plate intermittently to control the size of the wetting droplets on the nozzles plate.

According to a further feature of an embodiment of the present invention, the step of shielding the printing inkjet head partially from the printed substrate's heat and fumes using a shielding mask including an opening to maintain a predefined level of moisture adjacent to said nozzles plate.

According to a further feature of an embodiment of the present invention, the amount of fumes spread near the jetting nozzles is controlled by installing the nozzles close to an edge of the opening through the shielding mask.

According to a further feature of an embodiment of the present invention, a purge sequence of the printing inkjet head cleans up the spread of liquid droplets on the nozzles plate.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1A:
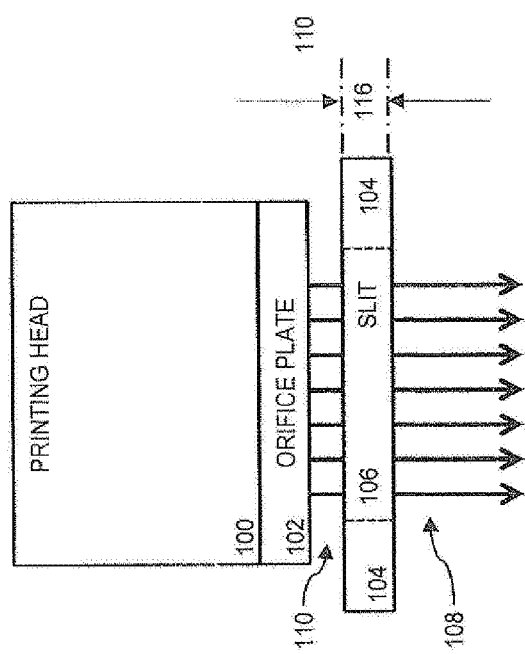
FIG. 1A illustrates a printing system with an integrated self-purge arrangement according to an embodiment of the present invention.

Embodiments of the present invention provide a printing system with an integrated self-purge, sediment prevention and fumes removal arrangements without purged liquid dripping from the nozzle plate. The integrated self-purge arrangement is desirable for high quality cleaning with lower costs and higher reliability than current techniques. In particular, the present embodiment facilitates printing while eliminating the time required for shifting the printing head to a maintenance area, as compared to the time required for conventional techniques. In addition, in a multi-head system (or a system with multiple groups of heads) where one maintenance area (or in general fewer maintenance areas than heads) are used for purging, the present embodiment facilitates reduced system complexity. For example, each head (or group of heads) has an integrated self-purge arrangement eliminating the need for competition and coordination of heads for maintenance areas. Although this embodiment is described with regard to an inkjet printing head, the described system and method is generally applicable to liquid-ejection nozzles of a liquid-ejection mechanism, such as nozzle dispensers.

In the context of this document, the terms printing liquid and ink refer in general to a material used for printing, and includes, but is not limited to homogeneous and non-homogenous materials, for example a carrier liquid containing metal particles to be deposited via the printing process.

According to a first aspect of the present invention, a printing head assembly with integrated purge mechanism, including: (a) a liquid dispensing head comprising one or more dispensing nozzles enclosed in a nozzle plate, driven by at least first and second pressures, and (b) a shielding mask including an opening in front of the one or more nozzles, wherein the opening being configured such that when printing liquid is dispensed from the head driven by the first pressure, the liquid being dispensed in pulses through the opening in the shielding mask, and when purge printing liquid is dispensed from the head driven by the second pressure, the liquid being drawn to a capillary gap formed between the shielding mask and the nozzle plate thereby removing the purge printing liquid from the nearby nozzles.

According to embodiments of the present invention, capillary action is used to capture printing liquid and prevent dripping of printing liquid from the printing head to the printing substrate Capillary action is the tendency of a liquid to be drawn into small openings. Capillary action, also known as capillarity, is a result of the intermolecular attraction within the liquid and solid materials. A familiar example of capillary action is the tendency of a dry paper towel to absorb a liquid by drawing the liquid into the narrow openings between the fibers. Another example is the tendency of liquids to rise in narrow tubes. The mutual attractive force that exists between like molecules of a particular liquid is called cohesion. Cohesion produces the phenomenon known as surface tension. When an attractive force exists between two unlike materials, for example a liquid and the edges of a solid container, the attractive force is known as adhesion. Capillary action is the result of cohesion of liquid molecules and adhesion of those molecules to the solid material forming a void, for example a void formed by the walls of a narrow tube. As the edges of the container are brought closer together, for example in a very narrow tube, the interaction of cohesion and adhesion causes the liquid to be drawn into the void formed by the edges of the container, in the current example into the narrow tube. In the context of this document, the void is formed by the capillary gap between the nozzle and mask plates.

A further aspect of the present invention relates to methods for preventing sediment accumulation on the printing head nozzles plate that may block or deflect the ink jets using fumes and for removing part of the fumes accumulated underneath the printing head on the nozzles plate.

According to a further aspect of the present invention, certain embodiments provide a method for printing with an integrated self-purge, sediment prevention and fumes removal arrangements. The method comprising the steps of (a) providing a printing system comprising one or more printing head assemblies with integrated purge mechanisms, each printing head assembly comprising: a printing head including one or more nozzles and a printing mask including an nozzle plate with an opening, aligned such that the nozzle plate opening is aligned with the one or more nozzles and a capillary gap is created between the printing head and the printing mask, (b) printing by actuating the printing head with a first pressure such that a printing liquid is ejected from the printing head passing through the nozzle plate opening, and (c) purging by actuating the printing head with a second pressure such that the printing liquid that has been ejected through one or more nozzles via the second pressure is captured by the capillary gap.

According to a further aspect of the present invention, the printing head is shielded from the substrate's heat and fumes by a mask, wherein the mask comprising a slit through which the ink is dispensed on the substrate. Furthermore, the printing head nozzles are located close to one edge of the slit and hence the major part of the fumes that enter the slit condensate at the center area of the nozzle plate as seen through the slit, and only a minute part of the fumes condensate near the edge of the slit.

The various aspects of the invention will be illustrated herein primarily by reference to a non-limiting example of a system and method for printing solar cells grid like contacts, but it will be appreciated that the various aspects of the present invention are equally applicable to a wide range of other ink jet printing systems.

Figure 1B:
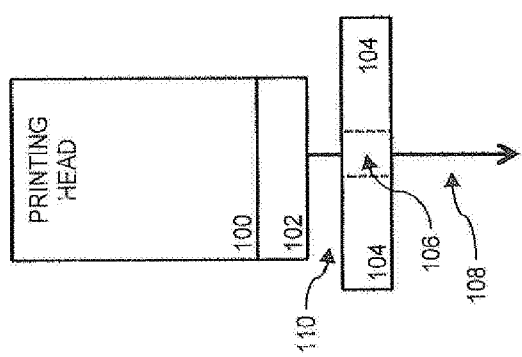
FIG. 1B illustrates a second view of a printing system with an integrated self-purge arrangement according to an embodiment of the present invention.

FIG. 1A illustrates a first view of a printing system with an integrated self-purge arrangement according to an embodiment of the present invention. For convenience FIG. 1A and FIG. 1B are arbitrarily referred to as a front view and side view, respectively. Note that figures are not drawn to scale. An inkjet printing head 100 includes an nozzle plate 102. Ink is printed from a plurality of nozzles (not shown) in the direction of arrows 108 to a printing substrate (not shown) that may be a front surface of poly silicon solar cell. Note that this system can be used for one or more nozzles, although normal usage in this field is with multiple number of nozzles. For convenience, the direction of the ink from the printing head to the printing substrate shown by arrows 108 is referred to as downward. FIG. 1A shows a plurality of arrows 108 indicating the printing direction of ink from an array of nozzles, while the side view of FIG. 1B shows only one arrow as from a side view only the single array is visible. A feature of this implementation is that the positioning of a printing mask 104, also referred to in this document as a mask, aligned with nozzle plate 102 creates a capillary gap 110 between the nozzle plate and the printing mask. During purging, the purged liquid adheres to the surfaces of capillary gap 110 and capillary action draws the purged liquid into the capillary gap. The nozzles of the printing head are aligned with a slit 106 in the printing mask 104 to facilitate printing.

Figure 1C:
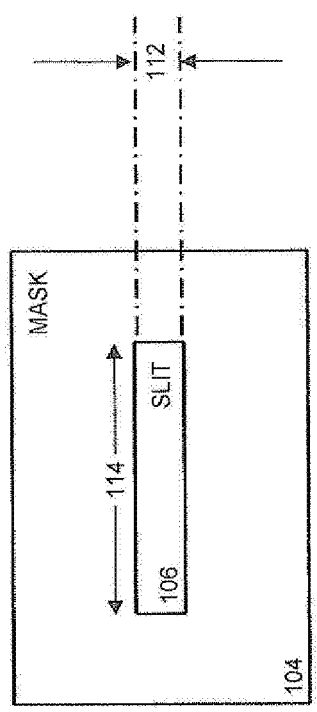
FIG. 1C illustrates a third view of a printing system with an integrated self-purge arrangement from the direction in which the ink is printed according to an embodiment of the present invention.

FIG. 1C illustrates a third view of a printing system with an integrated self-purge arrangement from the direction in which the ink is printed. For convenience, FIG. 1C is also referred to as a bottom view. For reference, the slit 106 has width 112 and length 114. Height 116, also referred to as depth, is generally substantially the same as the thickness of the printing mask.

A printing mask 104 is aligned with an nozzle plate 102 and positioned to create a capillary gap 110 between the printing mask and the nozzle plate. In the context of this document, a mask refers to a plate that partially covers nozzle plate 102 and has an opening to facilitate printing from nozzles to a print area. A nozzle plate 102 is generally used during the printing process to facilitate printing from the nozzles and can also provide protection for the printing head 100 and nozzles. In normal operation slit 106 in printing mask 104 is sufficiently wide and aligned sufficiently accurately with the printing nozzles to facilitate printing. In the case of an inkjet printing head 100, printing includes jetting droplets of ink from nozzles (not shown) in pulses where the jetting pressure is created inside the printing head 100 by piezoelectric crystals, one piezoelectric crystal for each nozzle. Jetting includes applying an appropriate pressure for an appropriate duration to the printing head, causing the printing head to discharge droplets of a printing liquid (ink) from the nozzles, through an opening (not shown) in nozzle plate 102, across gap HO, through slit 106 in printing mask 104, and onto a printing substrate (not shown). In one non-limiting example, a 20 um wide nozzle prints through a slit having a width 112 between 100 and 300 um.

During purging, an appropriate extra pressure is applied externally to the printing liquid and through the printing head 100 for an appropriate duration to push forcefully ink out of the printing head through the nozzles. The ink that emerges from the nozzles during purging first attaches to the nozzle plate 102 due to adhesion (as defined below, an attractive force between two unlike materials), which in this case is also known as the inks tendency to wet the nozzle plate. Wetting of the nozzle plate occurs even when the nozzle plate is coated with an anti-wetting coating. When mask 104 is aligned sufficiently close to nozzle plate 102, the mask is also wet by the ink. Due to adhesion, the ink does not tend to pass through slit 106. If mask 104 is positioned appropriately with respect to nozzle plate 102, the purged ink will tend to be drawn into capillary gap 110 due to capillary forces. The edges of capillary gap 110 share at least a portion of an edge of slit 106. Colloquially, because the purging does not require any additional hardware below the mask 104 (for collecting ink that may drip during purging and wiping the nozzle plate) this technique is referred to as "hidden purge".

The required size of a capillary gap to create a desired capillary action depends on the specific application, and more specifically, on the properties of the surfaces themselves and the liquid. In the context of this document, references to the size of the capillary gap refer to the distance between nozzle plate 102 and mask 104, unless otherwise specified. Given the physical characteristics of a printing liquid, nozzle plate, and mask plate, one skilled in the art can calculate the required size of a capillary gap to provide a desired capillary action.

In a non-limiting example where the nozzles are 20 um wide, the capillary gap 110 may be as large as 50 to 500 um. Within the bounds of the above-described embodiment, the preferred size for the capillary gap 110 is to be as small as possible so the nozzles can be as close as possible to the printing substrate, facilitating higher quality printing. Similarly, to enhance capillary action, the capillary gap should be as small as possible. The minimum capillary gap size depends at least in part on the physical characteristics of a printing liquid. The capillary gap size must be large enough to facilitate the flow and collection of printing liquid for the specific application. To facilitate capillary action, the purged printing liquid should preferably adhere to at least one of the slit edges (gap edges), hence the nozzles should be positioned as close as possible to a slit edge, facilitating the purged ink adhering to at least one slit edge (edges of the capillary gap). In the present example, a distance from a nozzle to a slit edge of 50 to 300 um is appropriate.

It is preferable for the slit to be sufficiently large to facilitate occasional wiping of the nozzle plate, for example, by a resilient thin wiper. In the current example, a slit width of 0.7 to 1.5 mm is sufficient. In this case, it is preferable for the nozzles to be positioned closer to an edge of the slit (in contrast to being positioned in the middle of the slit), to facilitate purged printing liquid adhering to the edge of the slit.

Similarly, mask 104 needs to be sufficiently thick (dimension 116) to provide the necessary mechanical strength and heat conduction, and preferably as thin as possible so the nozzles can be as close as possible to the printing surface. After purging, a delay provides sufficient time for substantially all of the purged liquid to flow from nozzle plate 102 into capillary gap 110. In a non-limiting example, after purging an inkjet head a delay of between 2 to 8 seconds is sufficient for the nozzle plate to be clear of ink, providing a high quality cleaning. After the delay, the printing head is ready to be used for printing.

It is preferable that both the nozzle plate and the inner side of the printing mask (in this context, the side of the printing mask that faces the nozzle plate) are coated with an anti-wetting coating. An anti-wetting coating reduces the tendency of the printing liquid to adhere to the surfaces of the nozzle plate and the inner side of the printing mask. The purged printing liquid needs to be removed from the capillary gap, or in other words cleared from the capillary gap. The frequency of clearing the capillary gap depends on the application. In one case, the capillary gap is cleared after every purge. The implementation of a clearing system depends on the application.

Figure 2A:
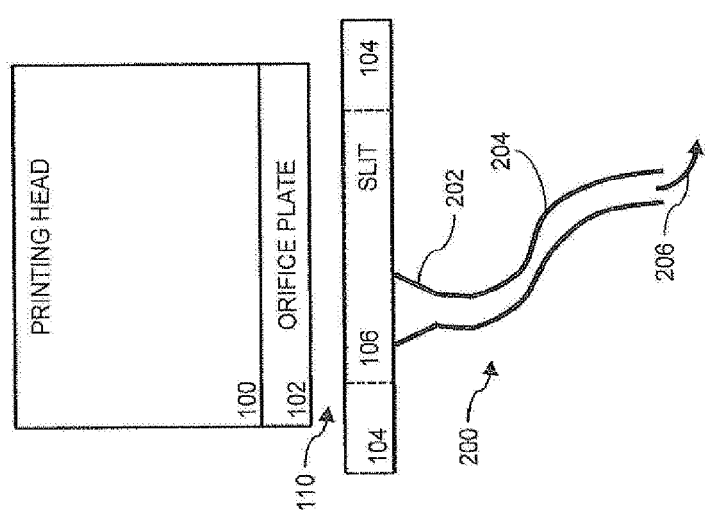
FIG. 2A illustrates a front view of a vacuum pipe system for clearing purged liquid, according to an embodiment of the present invention.
Figure 2B:
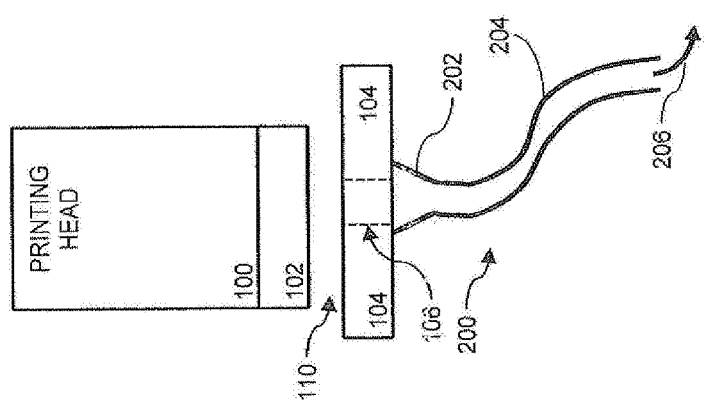
FIG. 2B illustrates a side view of a vacuum pipe system for clearing purged liquid, according to an embodiment of the present invention.

FIG. 2A and FIG. 2B illustrate a front view and a side view, respectively, of a vacuum pipe system for clearing purged liquid, a vacuum pipe system 200 is shown below mask 104 covering a portion of slit 106. In this case, the vacuum pipe system 200 includes a vacuum head 202 that moves along slit 106 from below. Vacuum head 202 connects to, or is part of, tube 204 which is connected to a pump (not shown) A vacuum, for example a reduced pressure of −0.4 to −0.8 Bar, is applied to tube 204 by the pump, and the force of the pressure gradient suctions the purged liquid from capillary gap 110 through slit 106 in the direction of arrow 206.

Vacuum head 202 can be firmly attached to the floor of the mask 104 covering the slit 106 so the suction of the vacuum head is primarily from the slit, while the vacuum head does not contact the nozzle plate. As can be seen in FIG. 2B, vacuum head 202 contacts mask 104 and covers the width of slit 106. In contrast, in the above-described conventional vacuum wiping technique, the vacuum head does not contact the nozzle plate resulting in low cleaning efficiency of the nozzle plate. In the present embodiment, cleaning the nozzle plate 102 is done during or after purge when the purged ink is drawn into the gap by capillary action with a high cleaning efficiency, and the vacuum pipe system 200 evacuates the purged liquid from the capillary gap 110 via the slit 106. In another embodiment, cleaning the nozzle plate 102 can be done during or after purge, by the vacuum pipe system 200 evacuating the purged liquid from the nozzle plate via the slit. Additionally cleaning time is reduced, as compared to conventional vacuum wiping. Vacuum pipe systems are known in the art, and based on this description one skilled in the art will be able to implement a vacuum pipe system appropriate for the application.

The above-described method is effective. However, in certain cases clearing a capillary gap without a system element below the printing mask is preferable. This feature is preferable in cases where the head is above the printing surface during cleaning, and facilitates reducing the time required for maintenance, hence increasing the printing speed.

Figure 3:
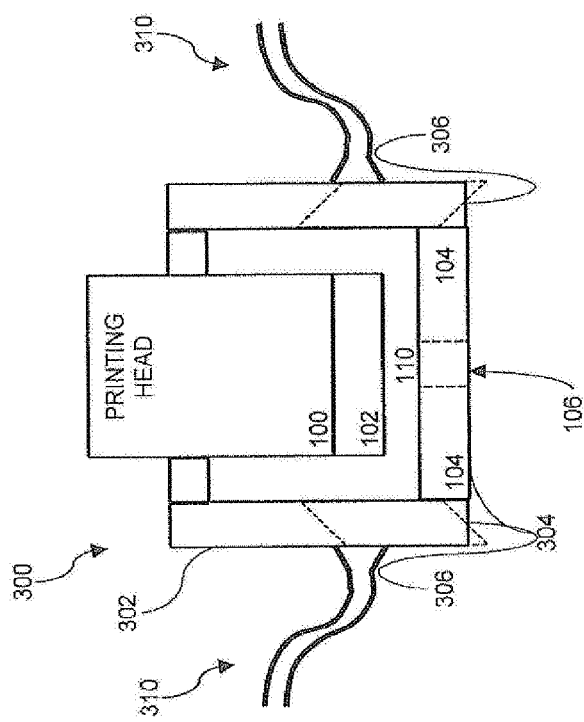
FIG. 3 illustrates a mechanism for clearing purged liquid, according to an embodiment of the present invention.

FIG. 3 illustrates a mechanism for clearing purged liquid, the printing head further includes a printing head housing 300, also simply known as a housing, which partially encloses printing head 100. Note that in the art a print head housing 300 is also sometimes referred to as a "mask", but should not be confused with mask 104, as used in this document. Housing 300 includes a side portion 302 that surrounds the sides of printing head 100. A bottom portion 304, also known as the floor, of housing 300 functions as mask 104 and partially encloses nozzle plate 102. Housing 300 includes one or more suction ports 306 connected to a vacuum system 310. The suction ports 306 facilitate the purged liquid being suctioned from capillary gap 110 out of the housing. Vacuum system 310 can be implemented similarly to the above-described vacuum pipe system 200, without requiring movement of the vacuum pipe system vacuum head 202. Vacuum system 310 can remain connected to housing 300.

In one non-limiting example, the system performs a purge followed by operation of vacuum system 310. In this case, the purged liquid is drawn into the capillary gap, as described above. At a determined time after the purge is completed, the vacuum system 310 is operated, evacuating the purged liquid out of the housing, as described above. In another non-limiting example, the vacuum system 310 is operated during purge. In this case, the purge is more efficient in that the suction adds additional pressure to the capillary action, helping to prevent purged liquid from dripping, and facilitates a faster purge, thus reducing cleaning time as compared to the above-described techniques. In contrast, in conventional purging techniques the vacuum wiping cannot be performed during purge, because purging is done from all nozzles at the same time (parallel nozzle purging), while the vacuum wiping is done by a vacuum head that only covers a portion of the nozzles at a time as the vacuum head moves across the nozzle plate. In an optional embodiment, the vacuum system 310 can operate independent of capillary action, during or after purge, evacuating the purged liquid from the nozzle plate via the gap 110. Optionally the purged liquid can be recycled from the vacuum system via appropriate filtering systems to the ink supply system. Vacuum systems are known in the art, and based on this description one skilled in the art will be able to implement a vacuum system 310 appropriate for housing 300 and the application.

Figure 4:
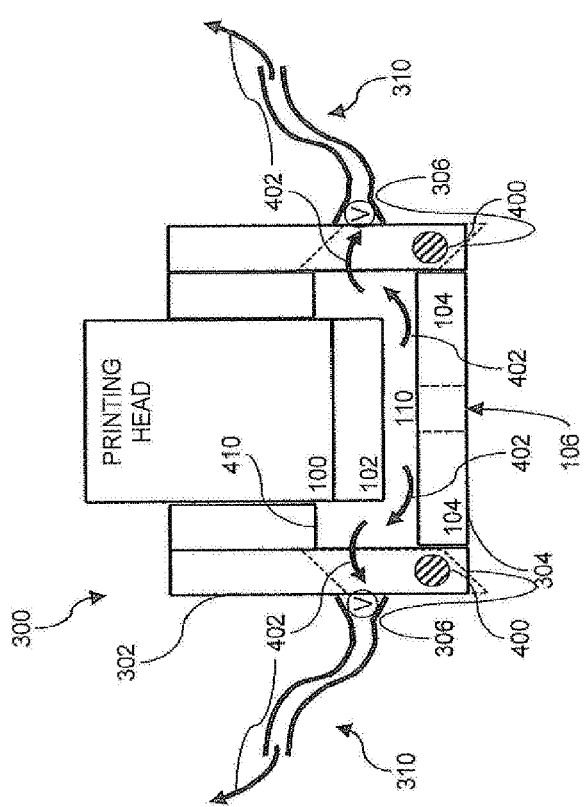
FIG. 4 illustrates a detailed diagram of a mechanism for clearing purged liquid, according to an embodiment of the present invention.

FIG. 4 illustrates a detailed mechanism for clearing purged liquid, the housing 300 further includes a cooling channel 400 through which a coolant passes. Depending on the application, printing head 100 and/or housing 300 may get hot from printing and require cooling, for example to protect the system from damage and/or maintain printing quality. Commonly, a heat source is outside the housing 300, and the housing protects the printing head 100 from damage due to heat. In a non-limiting example, main heat source is the printed substrate underneath the housing 300, such as solar cells silicon wafers on which metal lines are being printed. The solar cells silicon wafer may enter the printing zone after being warmed to 250 degrees Celsius. This temperature may be required to evaporate a liquid carrier of the metal particles including the ink such as silver particles. In this case, the housing 300 functions as a heat barrier that prevents the heat from the solar cells wafer from reaching the nozzle plate 102 of the printing head 100. In one optional embodiment, cooling channel 400 is a channel for a liquid coolant. The liquid coolant circulates through the channel as appropriate for the application, providing cooling for the system. Housing 300 can be constructed from aluminum, copper, or another material appropriate for the application, preferably a material that is a good heat conductor.

In a non-limiting example, housing 300 is constructed of aluminum and printing head 100 is an inkjet head. Referring also to FIGS. 1A,1B, and 1C, slit 106 has width 112 of 0.3 millimeter (mm). The slit width can be smaller or larger depending on the application. It is preferable that the slit width is larger than the diameter of the jetted droplets, and additionally large enough to allow for inaccuracies in straightness and alignment of nozzles. In a non-limiting example, when droplet diameter is 20 um, a slit width of 50 um is a preferred a minimum width. In a case where the slit is larger than the preferred minimum, it is preferable that the nozzles are sufficiently close to an edge (side) of the slit in order to facilitate the purged liquid adhering to the edges of the capillary gap 110. A non-limiting example of this case is where a slit width of 1 to 2 mm is used instead of a minimum slit width of 0.3 mm, and the nozzles are aligned to be 0.1 mm from an edge of the slit. As described above, once purged liquid adheres to an edge of the capillary gap 110, capillary action draws the purged liquid into the capillary gap behind the mask 104. Note that it is generally sufficient to draw the purged liquid into the capillary gap on one side of the slit, in this case, the side closer to which the nozzles have been aligned. In a case with an array of nozzles that includes two rows of nozzles, the slit width and alignment can be designed so that each row of nozzles is close to a respective edge of the slit. A height 116 of the slit of 0.3 mm corresponds to the thickness of the mask and is implemented as floor 304 of housing 300. The height can be smaller or larger depending on the application. While a smaller height, for example 0.2 mm, is possible, a smaller height is limited by practical considerations. Practical considerations include, but are not limited to, a smaller height corresponds to a thinner mask that generally has insufficient heat conductivity and is more easily damaged. While a larger height, for example 1 mm, is also possible, a larger height is limited by practical considerations including, but are not limited to, requiring a greater separation between a printing head and printing substrate, which as described above tends to reduce printing quality. A capillary gap 110 of 0.3 mm between the nozzle plate and the mask is preferable, but depending on the application, the capillary gap can be from 0.05 mm to about 0.5 mm A spacing 410 between side portion 302 of the housing and printing head 100 is preferably 0.3 mm, but depending on the application, the capillary gap can be from 0.1 ram to 1 mm.

Arrows 402 show the direction of flow of the purged liquid. Note that although in the two-dimensional diagram of FIG. 4 the arrows show flow away from slit 106 toward the left and right, in an actual three-dimensional system the flow is outward from slit 106 toward suction ports 306 connected to a vacuum system 310. Clearing can be initiated by activation of vacuum system 310 optional valve $V_f$ or other means appropriate for the application. In an alternative embodiment during purging the printing liquid that emerges from the nozzles attaches to the nozzle plate. A vacuum system 310 provides a negative pressure via gap 110 and suction cleans the purged printing liquid from nozzle plate 102.

Figure 5:
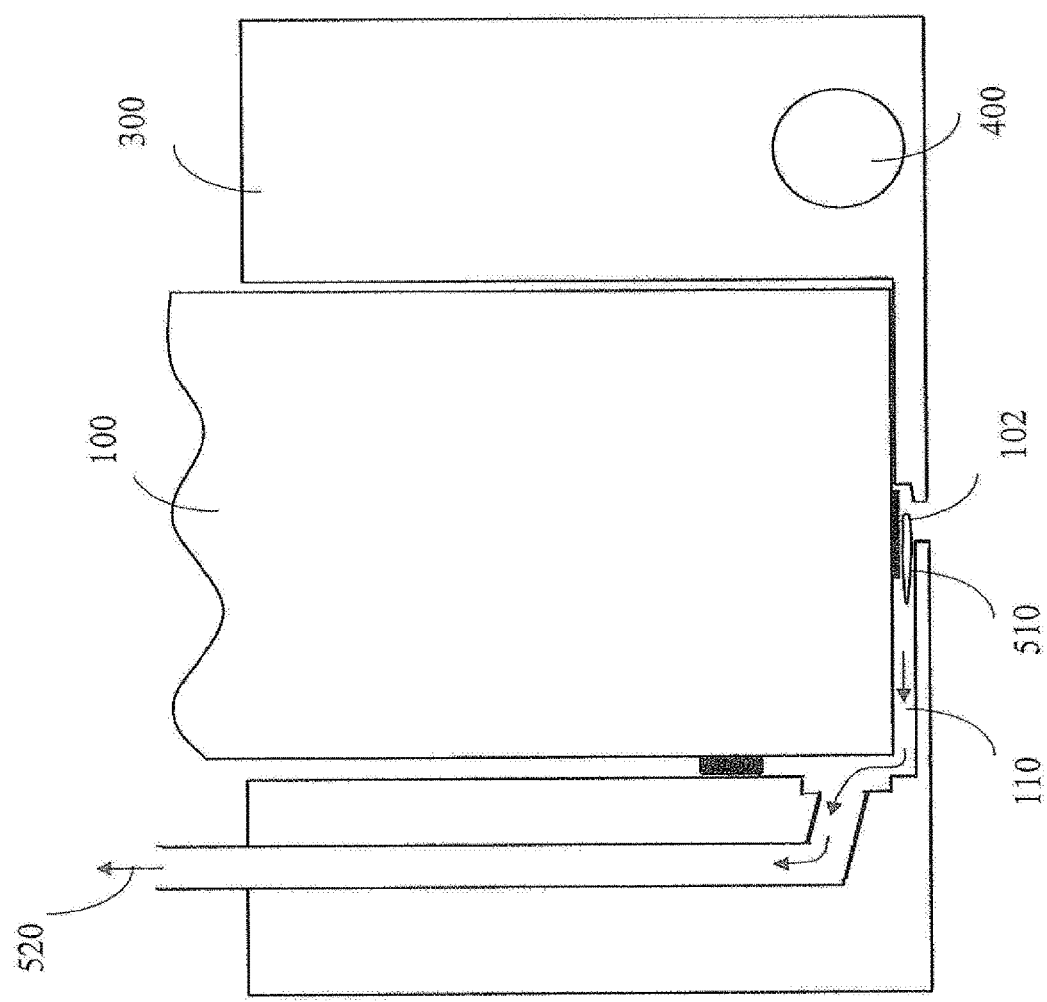
FIG. 5 illustrates the printing system capillary gap and evacuation of the purge printing liquid, according to an embodiment of the present invention.

FIG. 5 illustrates the printing system capillary gap and evacuation of the purging liquid, according to an embodiment of the present invention. Printing head 100 and housing 300 with optional coolant 400 are illustrated. Purge liquid 510 is driven through the array of nozzles (not shown) and through nozzle plate 102. The purge liquid 510 is drawn to capillary gap 110 and evacuated by vacuum pipe system through the capillary gap 110 and out of the printing head housing 520. The purge liquid may be re-circulated and stored in the interior portion of the printing heads configured to contain printing liquid.

The nozzle plate 102 of inkjet heads 100 is often coated by a non-wetting material that repels the printing liquid and prevents the printing liquid from sticking to the plate. As a consequence, the liquid that flows on the nozzle plate 102 easily converts to large drops 510 that are lightly attach to the nozzle plate and can be removed from it by a by the capillary gap 110 and by a vacuum pipe system.

Ink may accumulate on nozzle plate 102 in several ways: 1. During purging, the ink continuously flows out of the nozzle, and even with the best non-wetting coating the ink spreads over the nozzle plate rather than dropping off into the open air and substrate. 2. Jetted satellites (i.e. extremely small parasite droplets that accompany the much larger main droplet comprising a jetted ink) lose their velocity immediately after emerging from the nozzle (because of friction with air) and can easily flow back in the air and land on the nozzle plate. 3. Some minute part of the jetted ink that impinges on the substrate might go back like a ricochet towards the nozzle plate and stick to it. 4. Particularly when printing on a heated substrate, the solvent of the printing fluid deposited on the substrate evaporates rapidly, generating fumes of solvent vapor which may condense on the colder nozzle plate 102.

Particularly when printing with printing liquid ("ink") which contains solid particles, such as in the particularly preferred but non-limiting example of printing with conductive metal particles such as silver, the presence of ink on the nozzle plate may lead to significant problems. Specifically, if the ink on the nozzle plate is allowed to dry, a layer of particles is deposited onto the surface. Over time, multiple such layers may accumulate. These layers degrade the non-wetting surface properties of the nozzle plate and, if built up sufficiently close to the nozzles, may directly reduce print quality and eventually completely clog the nozzles.

According to a further aspect of the present invention, such deposition of particles is eliminated or reduced by managing the presence of liquid vapor in proximity to the nozzle plate so that any ink present on the nozzle plate does not dry on. The still-wet ink can then be removed periodically, by mechanical wiping or by suction, to prevent build up of material on the nozzle plate. Particularly in the preferred case of printing on a high-temperature substrate, such as a heated semiconductor wafer, solvent vapor is inherently generated from ink deposited on the substrate. However, excess vapor causes accumulation of large droplets on the nozzle plate which may themselves interfere directly with the printing process. Accordingly, this aspect of the present invention provides a vapor (or "fumes") management system which removes excess vapor while leaving sufficient vapor in the proximity of the nozzle plate to ensure that any ink on the surface does not dry out, yet without forming large droplets.

Assuming that the printing head comprises an array of nozzles, there are two ways to control the amount of fumes: evacuating part of the fumes by an auxiliary vacuum opening before the fumes reach the nozzle area and the second way refers to a case where in head is shielded from the substrate's heat and fumes by a mask, wherein the mask comprising a slit through which the ink is dispensed on the substrate. In such cases most of the fumes that enter the slit condense at the center area of the nozzle plate as seen through the slit, and only a lesser quantity of the fumes condense near the edge of the slit. In order to take advantage of this phenomenon, according to certain preferred implementations of the present invention, the slit in the mask is located such that the nozzles of the printing head are close to one edge of the slit. This positioning of the nozzles adjacent to one edge of the slit is also advantageous for the aforementioned capillary take-up of printing fluid during the purge process, ensuring that droplets forming at the nozzles during the purge process quickly come into contact with the capillary gap and are drawn into the gap.

Figure 6A:
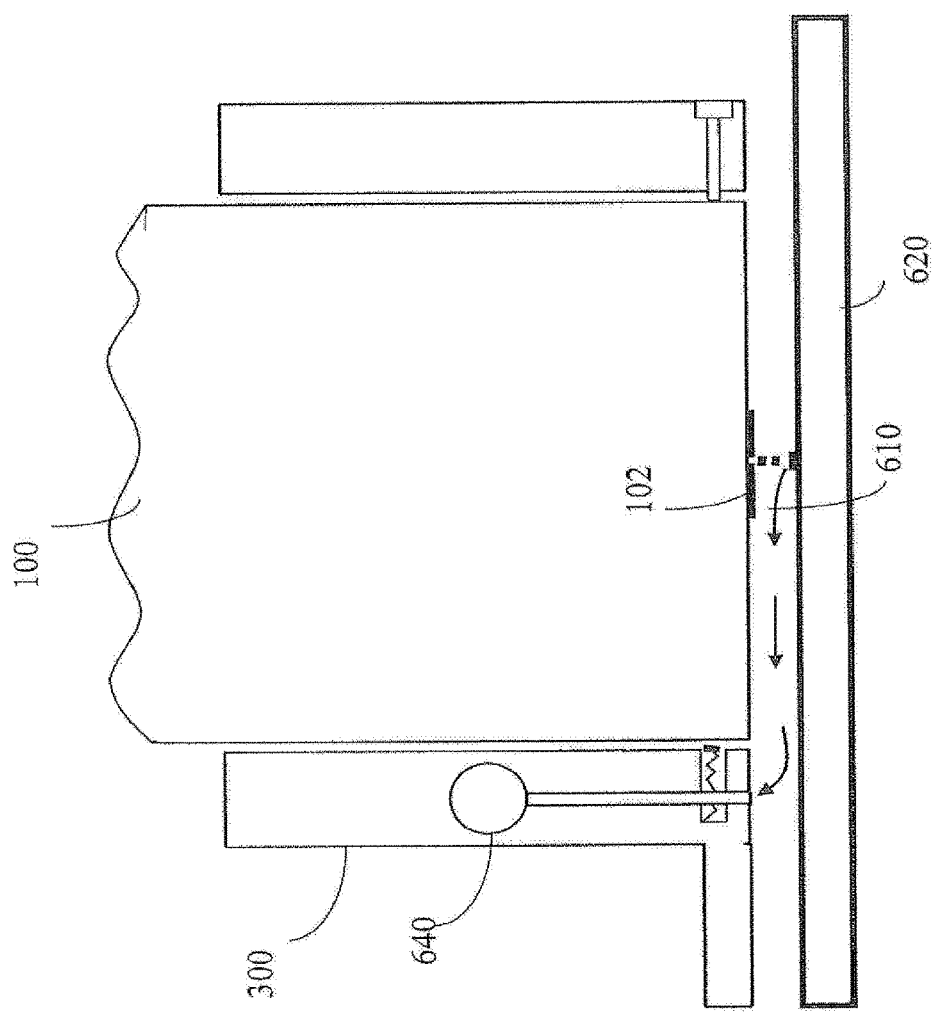
FIG. 6A illustrates a mechanism for removing fumes from the gap between the printing head and the printing substrate according to an embodiment of the present invention.

FIG. 6A illustrates a mechanism for removing excess fumes from the gap between the printing head and the printing substrate according to an embodiment of the present invention. Fumes 610 that may be formed by a hot substrate 620 after the printing liquid is ejected by printing head 100 through nozzles in the nozzle plate 102 are removed by auxiliary suction system 640 through the printing head housing 300.

Figure 6B:
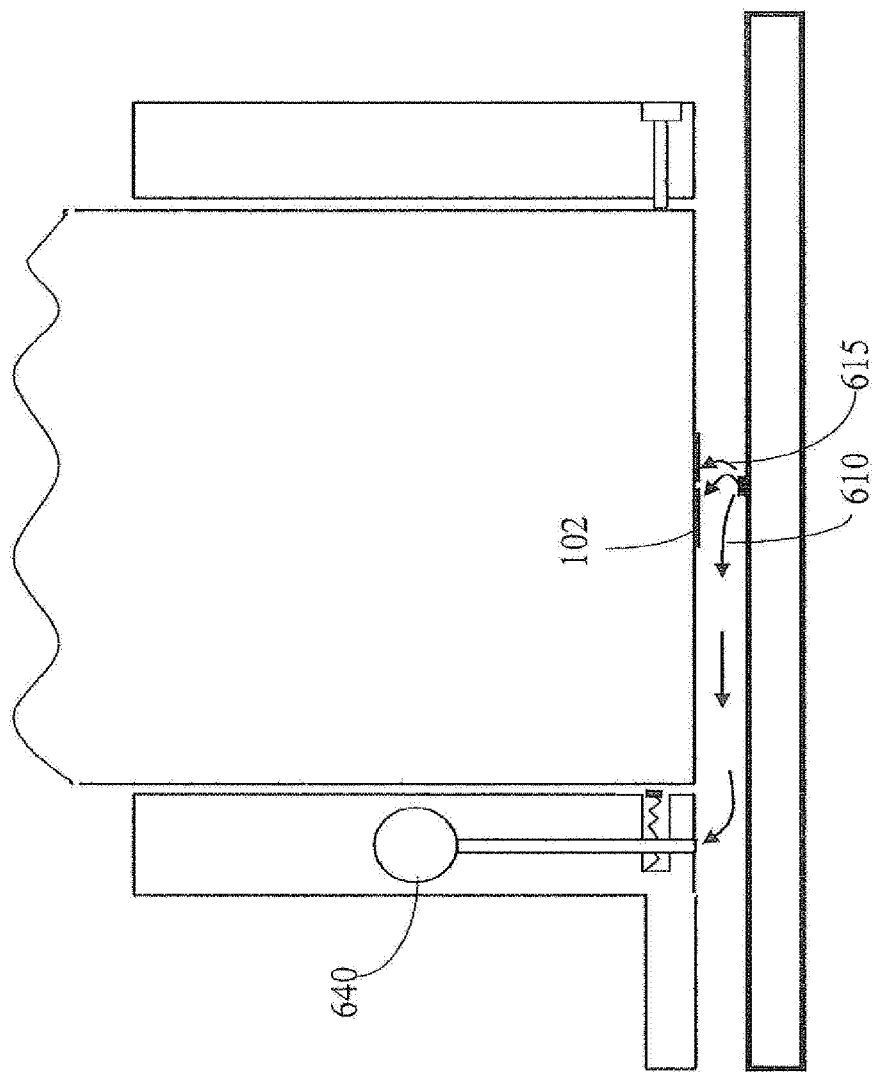
FIG. 6B illustrates a mechanism for removing part of the fumes from the gap between the printing head and the printing substrate according to an embodiment of the present invention.

FIG. 6B illustrates a mechanism for removing part of the fumes from the gap between the printing head and the printing substrate according to an embodiment of the present invention. Part of the fumes 610, typically 90% of the fumes, are being evacuated by auxiliary suction system 640 and the remaining part of the fumes 615 are accumulating on the nozzle plate 102. With very low fumes pressure the nozzle plate will be covered gradually by ink droplets and hence by solid sediment included in the ink such as silver particles for example. With high fumes pressure printing liquid droplets will agglomerate and may deflect and block the nozzle plate 102 nozzles.

Figure 7:
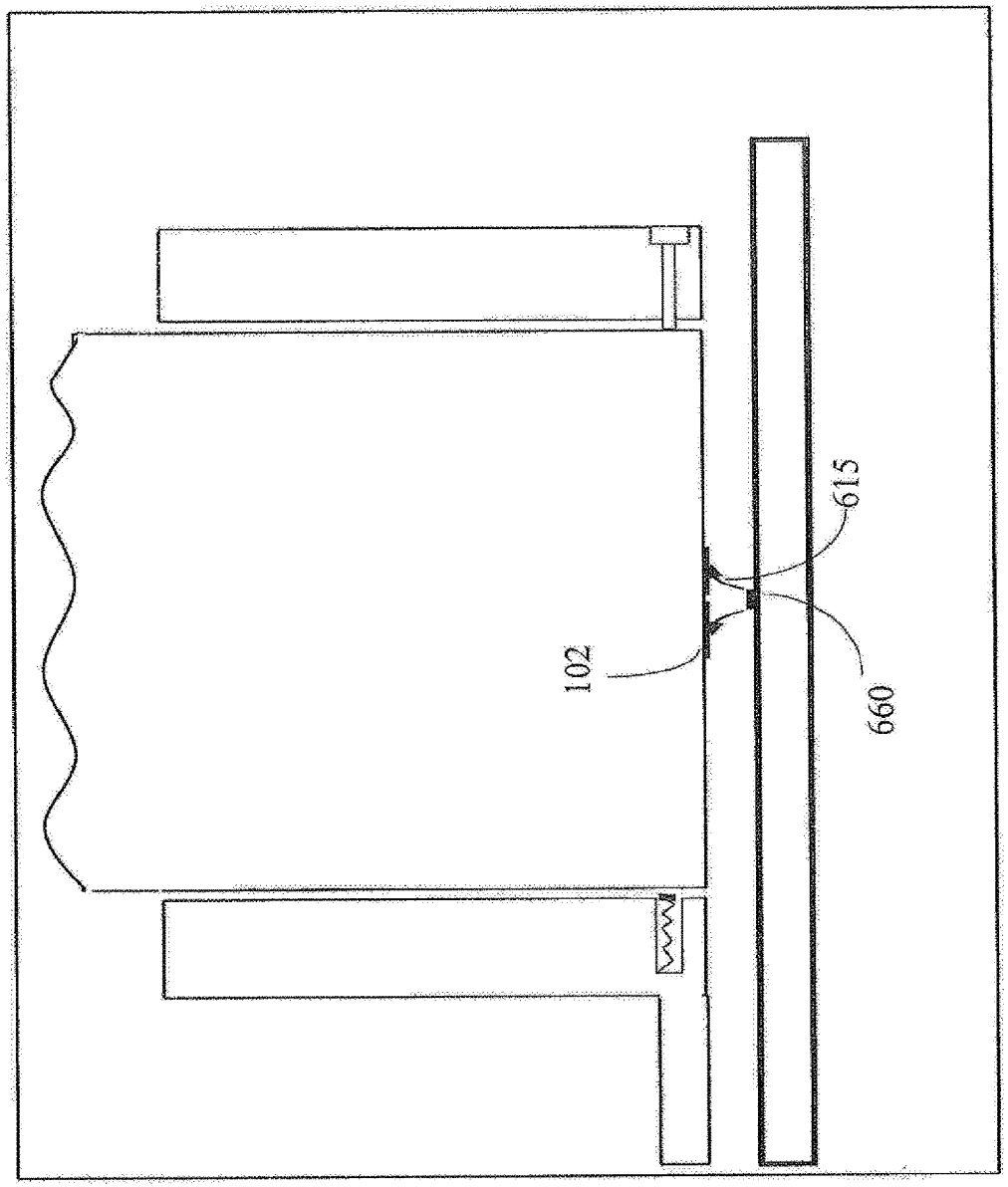
FIG. 7 illustrates fumes wetting the printing head nozzle plate according to an embodiment of the present invention.

FIG. 7 illustrates fumes wetting the printing head nozzle surface according to an embodiment of the present invention. A proportion of the fumes 615 accumulates on the nozzle plate 102.

According to embodiments of the present invention, since solid sediment deposition is avoided by maintaining the nozzle plate damp, the accumulated ink can be wiped off intermittently by a wiping service action with an absorbent sponge or the like. Repeated rubbing eventually degrades the non-wetting coating of the nozzle plate. According to the present invention, since drying out of the ink on the nozzle plate is avoided, the time between successive mechanical wiping of the nozzle plate may be greatly increased relative to conventional systems that rely upon wiping only without vapor control.

Figure 8:
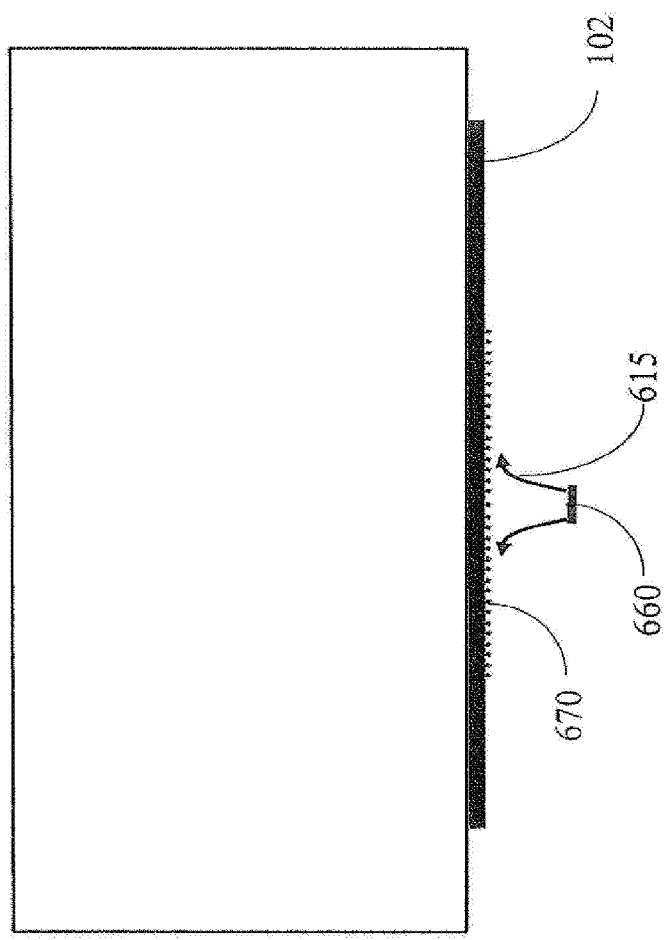
FIG. 8 illustrates tiny droplets formed on the printing head nozzle plate according to an embodiment of the present invention.

FIG. 8 illustrates tiny droplets forming on the printing head nozzle surface according to an embodiment of the present invention. The non-wetting coating applied to the nozzle plate 102 prevents big droplets sticking to the nozzle plate surface. However, hot fumes 615 emerging from the hot substrate printed image 660 form tiny droplets 670 on the nozzle plate surface 102.

Figure 9:
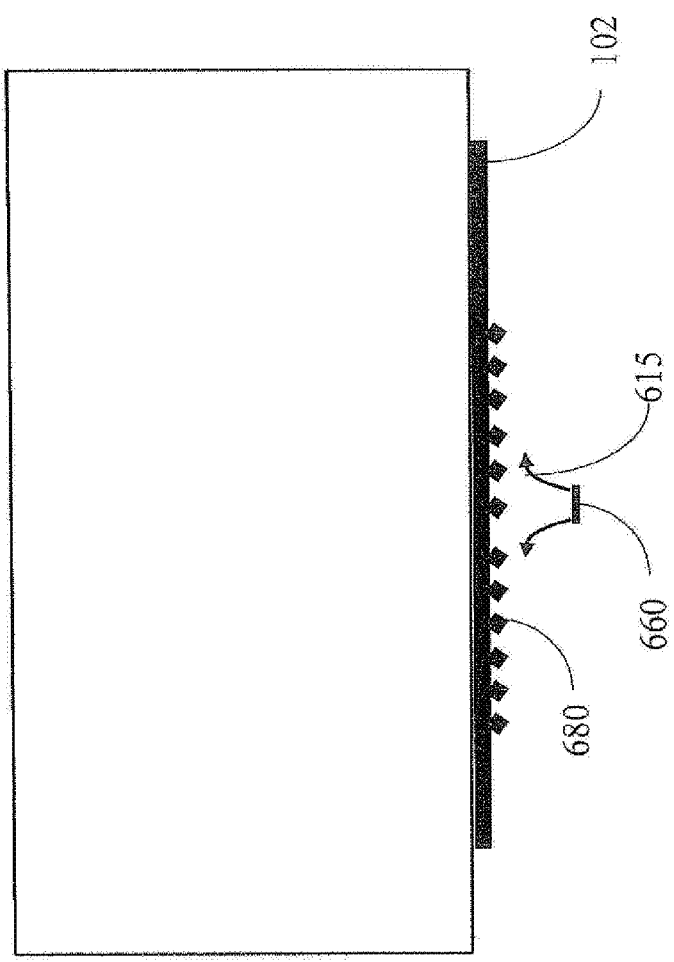
FIG. 9 illustrates large droplets that may disturb ejection of ink through the nozzles according to an embodiment of the present invention.

FIG. 9 illustrates large droplets that may disturb ejection of ink through the nozzles according to an embodiment of the present invention. The tiny droplets 670 illustrated in FIG. 8 may conglomerate into fewer larger droplets 680 on the nozzle plate surface 102 and may distract the ink jets and even block the nozzle plate nozzles with too high fumes pressure.

Figure 10:
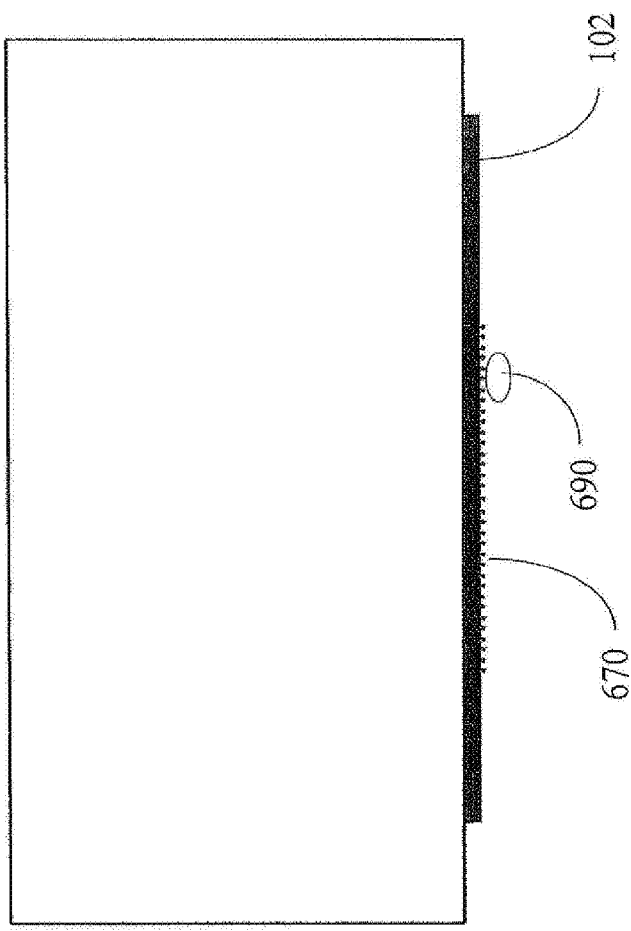
FIG. 10 illustrates an ink droplet floating over tiny droplets according to an embodiment of the present invention.

FIG. 10 illustrates an ink droplet floating over tiny droplets according to an embodiment of the present invention. Experiments showed that when the nozzle plate is wet having tiny droplets 670, printing fluid that comes in contact with the nozzle plate in large droplets 690 does not leave traces of solid sediment on the nozzle. This can be explained in that intimate touch of solid material in the ink with the nozzle plate's surface is prevented by the liquid layer of clear liquid that is spread on the nozzle plate, which buffers between the solid particles (or dissolved material) and the nozzle plate. Intimate touch may also be prevented if the ink does not really touch the nozzle plate but rather rides on the tiny droplets of clear liquid. The last sentence may explain the fact that even ink drops that stick on the nozzle plate do not leave solid sediment once they are removed. According to an alternative hypothesis, ink droplets 690 that stick on the nozzle plate do not contaminate the nozzle plate because of a continuous supply of spray or gas or steam of clear liquid also after an ink drop settles on the nozzle plate, preventing the adhering of solids on the nozzle plate. The ratio of fumes being evacuated to fumes being accumulated on the nozzle plate 102 depends on the auxiliary suction system efficiency and can be controlled by a skilled person. According to embodiments of the present invention a small amount of fumes on the nozzle plate prevent both sediment and printing liquid droplets accumulation as describe herein above.

Figure 11:
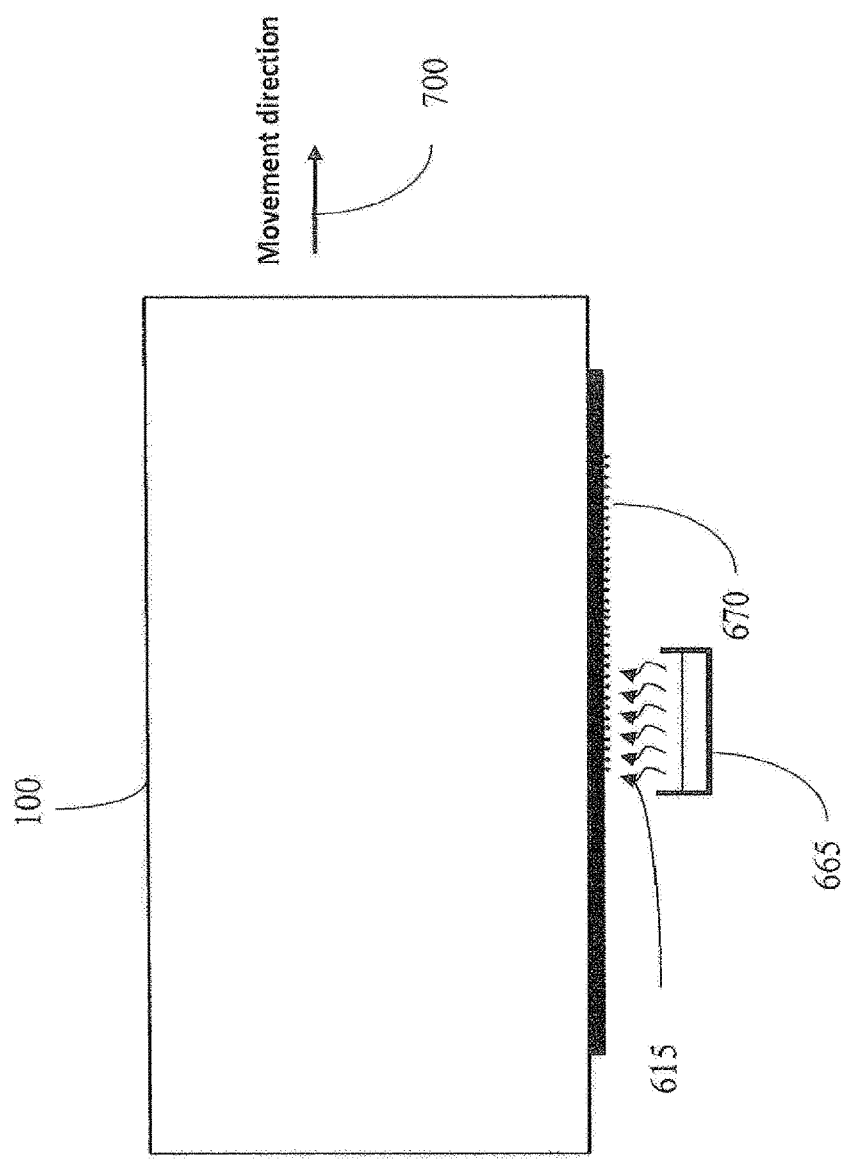
FIG. 11 illustrates an evaporation bath as a source of fumes according to an embodiment of the present invention.

FIG. 11 illustrates an evaporation bath as a source of fumes according to embodiments of the present invention. The fumes 615 may be generated, for example, by a warm pool of volatile liquid 665 underneath the head while the head exits the printing area 700. This option is particularly relevant in situations where printing is performed on a cold (non-heated) substrate such that the printing process does not inherently generate sufficient fumes to maintain the desired moisture level on the nozzle plate.

Wetting the nozzle plate may be required between each printing pass (e.g. each printed page). There could be cases, however, that it is sufficient to wet the nozzle plate only once before or after purging, or before or after any other maintenance operation. In that case wetting is done less frequently, as required. Another embodiment is spraying or directing liquid vapor or steam on the nozzle plate in-between printing runs (e.g. in-between different pages in 2D printing, or layers in 3D printing, or wafers in printing metal line on solar cells).

Assuming that the printing head comprises an array of nozzles, there are two ways to control the amount of fumes: evacuating part of the fumes by an auxiliary vacuum opening before the fumes reach the nozzle area and the second way refers to a case where in head is shielded from the substrate's heat and fumes by a mask, wherein the mask comprising a slit through which the ink is dispensed on the substrate. In such cases most of the fumes that enter the slit condensate at the center area of the nozzle plate as seen through the slit, and only minute fumes condensate near the edge of the slit. Thus the head is located behind the mask such that the nozzles are close to one edge of the slit.

Figure 12:
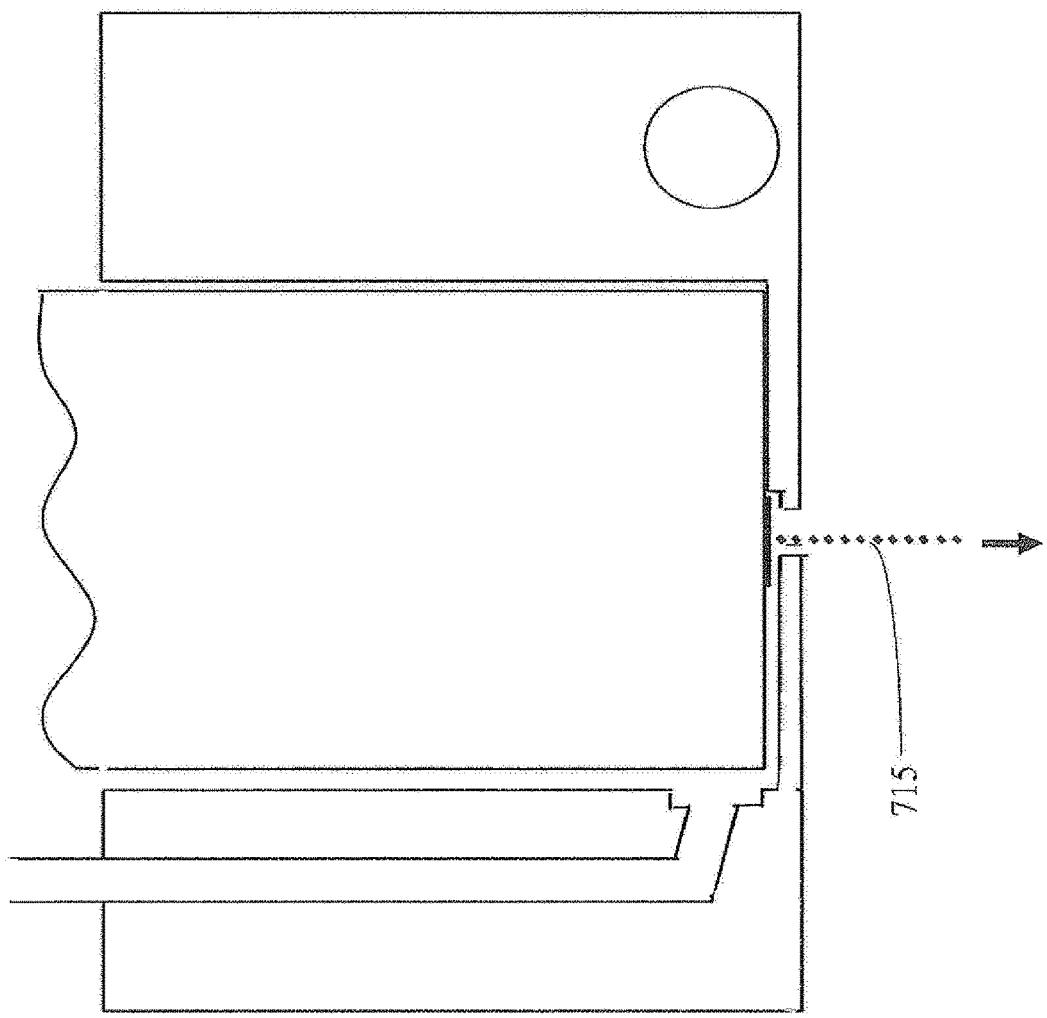
FIG. 12 illustrates an nozzle located close to the edge of the slit according to an embodiment of the present invention.

FIG. 12 illustrates an nozzle located close to the edge of the slit according to an embodiment of the present invention. The ink jets 715 that have typically 20 um diameter are shown to pass close to the slit edge.

Figure 13:
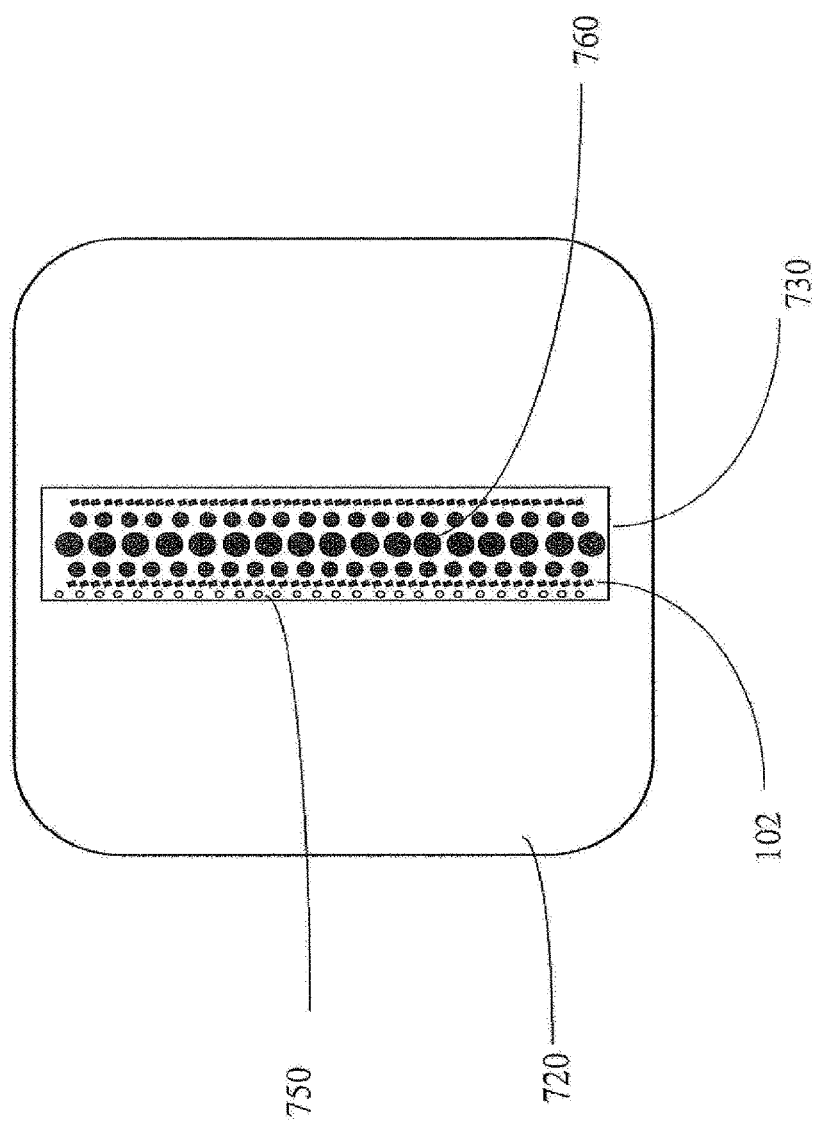
FIG. 13 illustrates a bottom view of the nozzle plate slit according to an embodiment of the present invention.

FIG. 13 illustrates a bottom view of the nozzle plate slit according to an embodiment of the present invention. Mask 720 has an opening in the form of a slit 730 and underneath the slit the nozzle plate 102 is illustrated. An array of nozzles 750 are illustrated wherein the slit 730 is off center relative to the nozzles 750 such that a distance from the nozzles to one edge of the slit is less than 20% of a distance from the nozzles to the opposing edge of the slit. The condensed liquid droplets 760 agglomerate mostly in the center of the slit 730 and only a small fraction and smaller in diameter liquid droplets reach the slit edge where the array of nozzles 750 are located.

Figure 14:
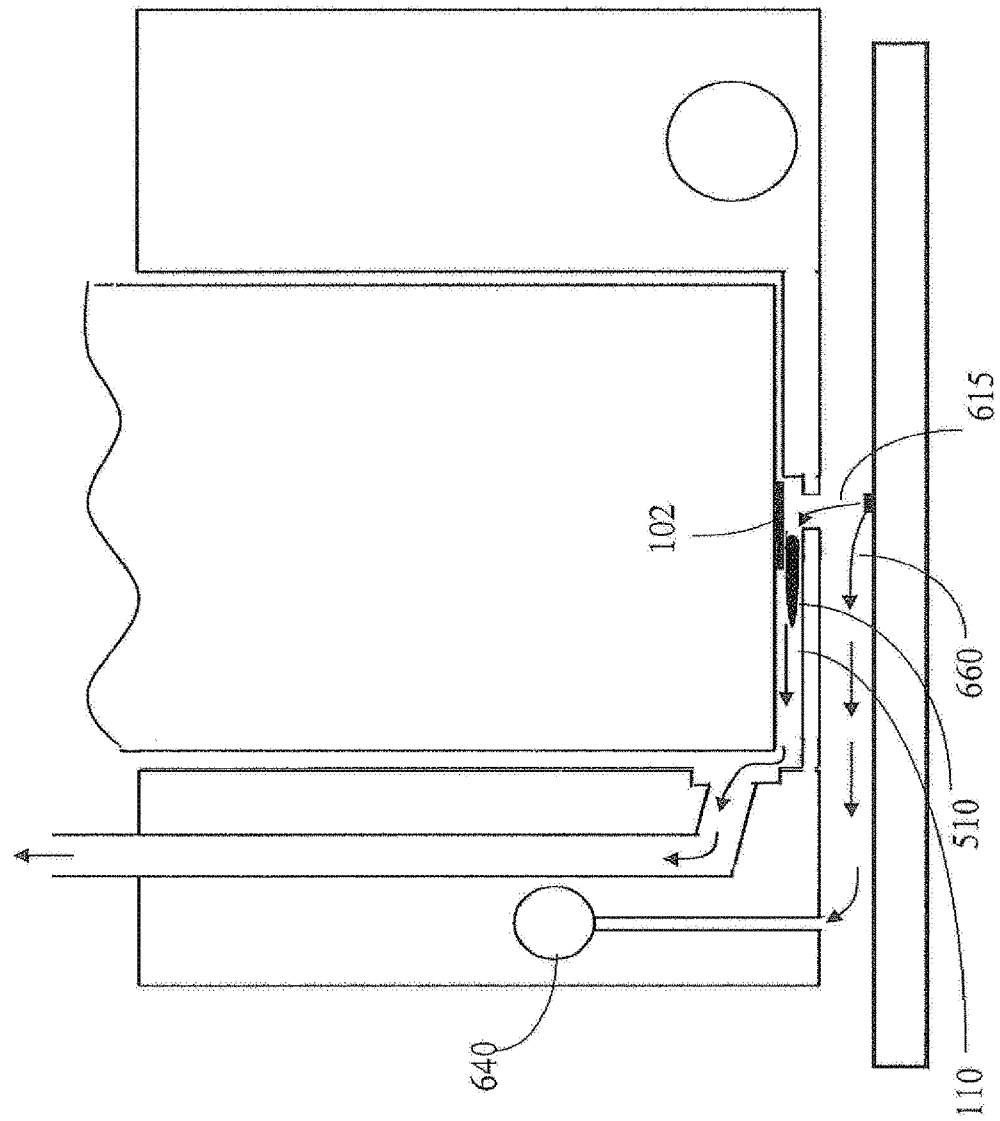
FIG. 14 illustrates a printing head assembly with an integrated self-purge and fumes removal arrangements according to an embodiment of the present invention.

FIG. 14 illustrates a printing head assembly with an integrated self-purge and fumes removal arrangements according to an embodiment of the present invention. Auxiliary suction system 640 is deployed to maintain a pre-defined level of moisture adjacent to the nozzle plate 102. Auxiliary suction system 640 removes the major part of the fumes 695 while smaller part of the fumes 615 reach the nozzle plate 102. Capillary gap 110 draws a large drop of purge printing liquid 510 which may be removed by vacuum pipe system (not shown). The suction system provides a pressure gradient to capillary gap 110, thereby removing the purge printing liquid 510 from the capillary gap 110. The purge printing liquid 510 may be re-circulated to the printing head interior portion configured to contain printing liquid The frequency of purging depends on the specific application for which the printing head is being used. In one embodiment, purging is initiated periodically as a step in a continuous printing process. In another embodiment, purging is initiated according to a predetermined schedule, in another embodiment, purging is initiated based on system requirements. One non-limiting example of system requirements is using an inspection camera to track printing quality. If printing quality does not satisfy given parameters, purging is initiated.

An embodiment of the present invention facilitates an efficient printing sequence and purging maintenance cycle, taking advantage of purging without dripping, and cleaning without a system element below the printing mask. In one embodiment of a purging maintenance cycle, during continuous printing a printing head stops printing, remaining in place above a printing surface. A purge is initiated that takes from 0.2 to 0.5 seconds. After purging, a delay of about 5 seconds provides sufficient time for substantially all purged liquid to flow from a portion of a nozzle plate that is aligned with a slit into the gap between the nozzle plate and a mask. Operation of a vacuum system for 1 to 3 seconds provides pressure to suction the purged liquid from the gap. Printing can resume when suction is completed. Printing can also resume during suction, as described above, in which case suction pressure should be verified to be an appropriate level to allow accurate printing and accurate jetting direction. Printing resumes without the printing head taking time to shift from the printing area to a maintenance area.

In an optional embodiment, if purging is not sufficient to clean the printing nozzles and maintain printing quality, reduced pressure can be applied near the nozzles from a source other than the printing head. In contrast to applying positive pressure to the nozzles from inside the printing head, applying pressure gradient can be more effective in opening a clogged nozzle. The system described in reference to FIG. 2 can provide the required reduced pressure of about −0.4 to −0.8 Bar to facilitate this method of cleaning the printing nozzles.

According to embodiments of the present invention, the printing system may be used in mass continuous printing, such as the case of printing metal contact lines of solar cells above a conveyor system in a solar cell production line. In normal operation, the conveying system runs continuously, requiring a printing system that runs continuously, or runs with minimal maintenance time. Normally the conveyor system is not able to be stopped to allow maintenance time for a printing system. Because a printing head in the printing system needs to purge, a conventional solution is to provide a redundant second printing head to replace the active first printing head, allowing printing to continue without stopping the conveyor system using a separate purge area and a mechanism to transfer the printing head to the purge area.

Using an embodiment of the present invention, depending on the specifics of the application, an active first printing head can perform a purge within the inherent small delay time between consecutive solar cells, or group of cells, with no need to shift the printing head to a maintenance area and hence without slowing the continuous printing. The redundant second printing head can be activated to insure continuous printing, and the previously active first printing head can be purged quickly using embodiments of the present invention, facilitating the first printing head being ready quickly to replace the second printing head, maintaining continuous printing with the required print quality.

According to embodiments of the present invention, the printing system typically includes a control system (not shown) including at least one processor and configured by suitable hardware and/or software to coordinate operation of the print heads, the various suction systems, the vapor control arrangement and/or the cooling system to perform the various functions described herein.

Advantageously, the printing head assembly of the present invention may be used for printing solar cells grid-like contacts with typically 50 um line width and 20 um line height on a hot solar cells poly silicon substrate.

Another advantage of the printing head assembly described above is that mass printing may be done continuously where purging the printing head assembly is performed during printing in the printing area with no need to shift the printing head to a maintenance area.

Another advantage of the printing head assembly described above is that printing metal contact lines may be done in one passage of the printing head assembly over the substrate where the printing liquid evaporates fast enough such that the next printing head ejects the printing liquid on a dry line of printed silver such that printed line builds up in layers vertically and spread out horizontally on the hot surface minimally.

Furthermore, the present invention printing head assembly may be used for other ink jet printing applications such as ink jet printing on paper. Any other application wherein the printing head needs efficient purging also fall within the scope of the present invention.

In summary, the printing head assembly of the present invention improve the prior art solar cells grid like contact printing ink jet heads by introducing self purging, sediment prevention and fumes removal arrangements. The printing head assembly may enable faster and higher quality mass ink jet printing.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

What is claimed is:

1. A printing method for manufacturing an object, the method comprising:
    supporting a print head having a plurality of nozzles located in a nozzle area for expelling a printing fluid towards a printing area during a multi-layered additive process;
    expelling printing fluid from the print head through an opening in a mask located between the nozzle area and the printing area;
    purging the printing fluid from the print head by forcing the printing fluid through the plurality of nozzles when the print head is not printing; and
    evacuating the purged printing fluid to prevent the purged printing fluid from dripping through the opening.

2. The printing method of claim 1, wherein evacuating the purged printing fluid occurs using a pump.

3. The printing method of claim 2, further comprising drawing the purged printing fluid to a gap formed between the mask and the nozzle area, wherein the pump is configured to evacuate the purged printing fluid from the gap during the additive process.

4. The printing method of claim 2, further comprising connecting a vacuum head to the pump and to the mask.

5. The printing method of claim 1, further including recycling the purged printing fluid to an ink supply system.

6. The printing method of claim 1, wherein purging is periodically initiated during the additive process, such that the plurality of nozzles are cleaned during the additive process.

7. The printing method of claim 2, wherein the pump applies a negative pressure to evacuate the purged printing fluid.

8. The printing method of claim 7, wherein the pump applies a pressure of −0.4 to −0.8 Bar to evacuate the purged printing fluid from the gap.

9. The printing method of claim 3, wherein a negative pressure is maintained in the gap during the purge process.

10. The printing method of claim 9, wherein the negative pressure is maintained using at least one processor.

11. The printing method 40, wherein the at least one processor causes the print head to purge the printing fluid for less than 0.5 seconds, and controls the pump to evacuate the purged printing fluid from the gap in less than 3 seconds.

12. The printing method of claim 10, wherein the at least one processor causes the pump to apply a pressure gradient in the gap to remove the purged printing fluid through at least one suction port.

13. The printing method of claim 1, wherein the pump applies a pressure gradient across the opening to remove the purged printing fluid through the mask opening.

14. The printing method of claim 4, wherein the vacuum head covers at least a portion of the mask opening.

15. The printing method of claim 4, wherein the vacuum head moves along the mask opening.

* * * * *